(No Model.)
L. A. SANFORD.
BELL FOR BICYCLES.
No. 585,482. Patented June 29, 1897.
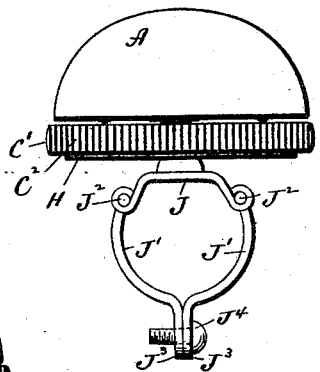
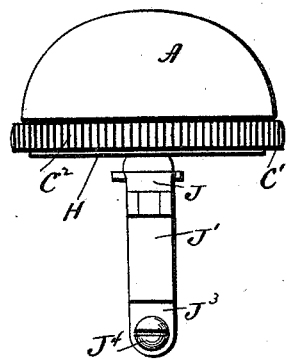
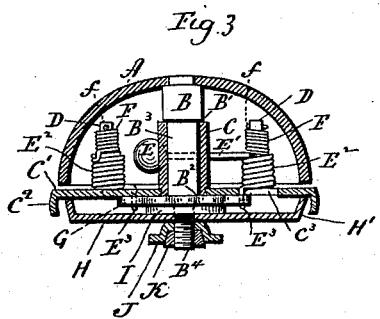
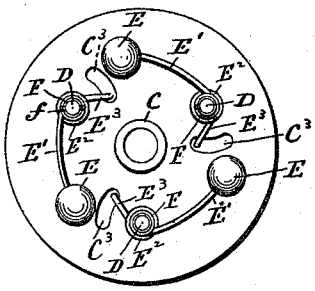
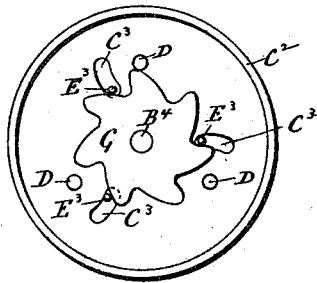
Witnesses.
J. H. Shumway
Lillian D. Kelsey
Leverett Arthur Sanford.
Inventor.

United States Patent Office.

LEVERETT ARTHUR SANFORD, OF BRISTOL, CONNECTICUT, ASSIGNOR OF ONE-HALF TO DUNBAR BROTHERS, OF SAME PLACE.

BELL FOR BICYCLES.

SPECIFICATION forming part of Letters Patent No. 585,482, dated June 29, 1897.

Application filed July 20, 1896. Serial No. 599,778. (No model.)

*To all whom it may concern:*

Be it known that I, LEVERETT ARTHUR SANFORD, of Bristol, in the county of Hartford and State of Connecticut, have invented a new Improvement in Bicycle-Bells; and I do hereby declare the following, when taken in connection with the accompanying drawings and the letters of reference marked thereon, to be a full, clear, and exact description of the same, and which said drawings constitute part of this specification, and represent, in—

Figure 1, a view in side elevation of a bicycle-bell constructed in accordance with my invention and looking at the clip flatwise; Fig. 2, a similar view looking at the clip edgewise; Fig. 3, a sectional view of the bell with a portion of the clip broken away; Fig. 4, a plan view of the bell with the gong removed; Fig. 5, a reverse plan view of the bell with the clip and cap removed to show the ratchet-like wheel, the tails of the hammer-wires, and the operating-plate and the segmental slots therein.

My invention relates to an improvement in portable bells, the object being to produce at a comparatively small cost for manufacture a simple, compact, durable, and effective bell designed with particular reference to convenience of operation and well adapted to be used as a bicycle-bell on that account.

With these ends in view my invention consists in a bell having certain details of construction and combinations of parts, as will be hereinafter described, and pointed out in the claims.

In carrying out my invention as herein shown I employ a hemispherical gong A, which is riveted or otherwise rigidly secured to a centrally-arranged long heavy stud B, formed with a shoulder B', a shoulder B², a bearing B³, located between the said shoulders, and with a threaded stem B⁴, in which it terminates. The bearing B³ of this stud receives the centrally-arranged upwardly-extending hub C of a disk-shaped rotatable operating-plate C', which is very slightly larger in diameter than the open end of the gong A and constructed with a downwardly-extending fluted operating-flange C². The said operating-plate is thus arranged below but in very close proximity to the open end of the gong, being concentric with the gong and located in a plane parallel with the plane of the open end thereof. The shoulder B' of the said stud rests upon the end of the hub, as shown in Fig. 3. The said plate thus made is rotatable in either direction with reference to and independently of the gong, the hub C providing a long bearing for its rotation upon the bearing B³ of the stud B, as aforesaid. The said rotatable plate C' is furnished, as herein shown, with three upwardly-projecting hammer-studs D D D, arranged at equal distances from the hub C and, as it were, at three points of an equilateral triangle. These studs form pivots or fulcra for the bell hammers or strikers E, which are secured to hammer-wires E', each hammer-wire being coiled to form an eye E² of as many coils as is found necessary to prevent the eyes from cocking on the studs. These eyes are passed down over the studs and rest upon the plate.

The inner ends of the hammer-wires are bent to form hammer-tails E³, which extend downward through segmental slots C³, of which three are formed in the plate between the three studs D, before mentioned. Three small hammer-springs F, mounted upon the upper ends of the hammer-studs D, are engaged with the hammer-wires and with pins f, extending transversely through the extreme upper ends of the said studs, these springs exerting a constant effort to throw the hammers outward toward the gong.

The downwardly-projecting hammer-tails are engaged for operation by a non-rotatable ratchet-like wheel G, which bears upon the shoulder B² of the gong-stud B. The ends of the hammer-tails and the said wheel are concealed and protected by means of a shallow cup-shaped base H, having an inwardly-turned flange H', which extends upward within the flange C² of the rotary operating-plate, a washer I being interposed between the said cap and wheel, which is located within the base and very close to the lower face of the operating-plate C'.

The threaded stud B⁴ projects through the wheel, washer, and base for the reception of the clip, by means of which the bell is secured to the handle-bar of a bicycle. As herein shown, the clip consists of a centrally-cupped body portion J, having two corresponding clamping-arms J' J', hinged to it, as at J² J², the lower ends of the said arms being furnished with transversely-perforated lugs J³ J³, receiving a clamping-screw J⁴. A small nut K, applied to the extreme end of the threaded stem B⁴ within the cupped center of the body portion of the clip, draws the parts together and binds the ratchet-like wheel G against the shoulder B² of the gong-stud B.

It will be readily understood from the foregoing description that when the operating-plate is turned in one direction or the other through the medium of its knurled flange the tails of the hammers will be forced outward against the tension of the coiled hammer-springs by the riding of the said tails upon the teeth of the ratchet-like wheel, which remains at rest. As soon as the hammer-tails drop off from the points of the teeth and between the same the hammer-springs will throw the hammers outward with sufficient force to cause the hammer-wires to spring enough to allow the hammers to impinge against the inner face of the gong, for the hammer-tails themselves will be engaged with the inner ends of the slots before the hammers touch the gong, the yielding of the hammer-wires being relied upon to allow the hammers to go a little farther and strike the gong. If the plate is turned rapidly, the hammer-tails will be successively engaged by the teeth of the wheel, so that the hammers will strike the bell in quick succession. On the other hand, if the plate is turned only for a very short distance the ringing of the gong will be limited to a single stroke by each hammer.

When the bell is not in use, all the hammers will be held away from the gong by the stopping action of the hammer-tails against the inner ends of the segmental slots in the operating-plate, so that no vibration or jarring of the bell can effect the untimely sounding of the same.

I would call attention to the fact that when used as a bicycle-bell it is very conveniently operated, for the reason that the rider instead of having to manipulate a finger-lever has merely to push his finger against the roughened flange of the rotary plate, which will then turn and ring the bell.

In carrying out my invention many changes from the construction herein shown and described may be made. Thus I may employ one bell-hammer or two or three, as shown, or more, and I may modify the action of the bell by increasing or decreasing the number of teeth in the ratchet-like wheel. I do not limit myself to employing the peculiar clip shown and described, as that may assume a variety of forms, but the form shown I have found to be effective. I would therefore have it understood that I do not limit myself to the construction shown and set forth, but hold myself at liberty to make such changes and alterations as fairly fall within the spirit and scope of my invention.

Having fully described my invention, what I claim as new, and desire to secure by Letters Patent, is—

1. In a bell, the combination with the gong thereof, of a centrally-arranged stud to the upper end of which the gong is rigidly secured, a rotatable disk-shaped operating-plate located close to the open lower end of the gong, than which it is slightly larger in diameter, and rotating upon the said stud as upon a center, a base located below the said plate and connected with the lower end of the said stud, one or more hammers mounted upon the said plate, and a non-rotatable ratchet-like wheel, the teeth of which are engaged by the tails of the hammer-wires when the operating-plate is rotated.

2. In a bell, the combination with the gong thereof, of a centrally-arranged stud to the upper end of which the gong is rigidly secured, a rotatable disk-shaped operating-plate located below the bell and close to the open end thereof, and provided with an upwardly-extending hub having bearing upon the said stud, one or more hammers mounted upon the said plate and having downwardly-projecting hammer-tails which extend through the slots formed in it, a base connected with the lower end of the stud and concentric with the gong and operating-plate, and a non-rotatable ratchet-wheel interposed between the operating-plate and base in position to have its teeth engaged by the tails of the hammer-wires.

3. In a bell, the combination with the gong thereof, of a centrally-arranged stud to the upper end of which the gong is rigidly secured, a rotatable disk-shaped plate located below and close to the open end of the bell, than which it is slightly larger in diameter, and rotating upon the said stud as upon a center, a shallow cup-shaped base located below the operating-plate and connected with the lower end of the stud, one or more spring-actuated hammers mounted upon the said plate and located within the gong, and a non-rotatable ratchet-like wheel located close to the lower face of the operating-plate and engaged by the downwardly-projecting tails of the hammer-wires when the operating-plate is rotated.

In testimony whereof I have signed this specification in the presence of two subscribing witnesses.

LEVERETT ARTHUR SANFORD.

Witnesses:
E. S. FISH,
R. A. SANFORD.